Figure 2:
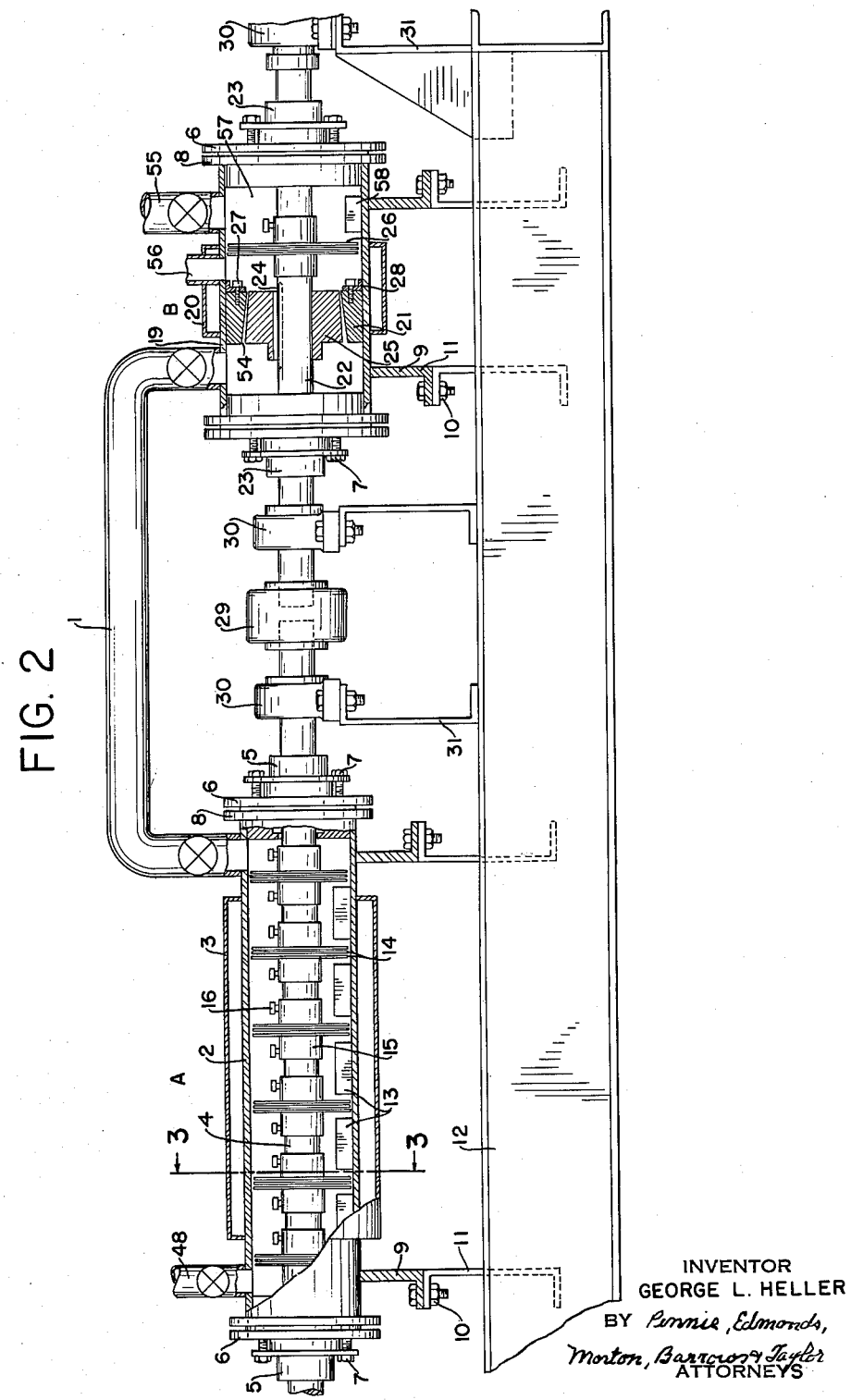

May 1, 1962 G. L. HELLER 3,032,430
PROCESS FOR EFFECTING PARTICULATE DISPERSIONS
Filed Jan. 16, 1957 2 Sheets-Sheet 1
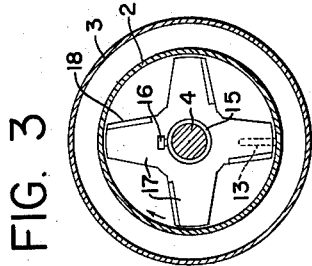
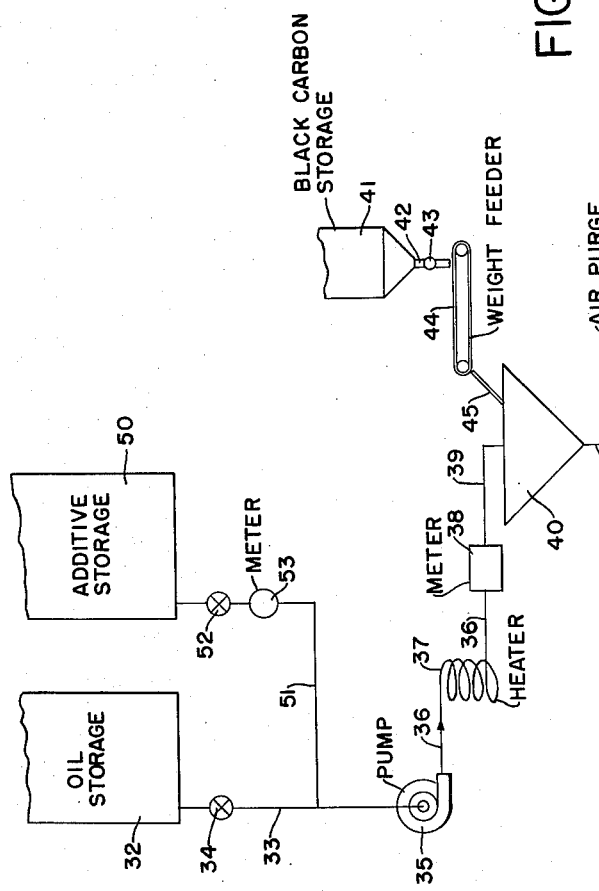
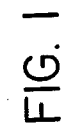
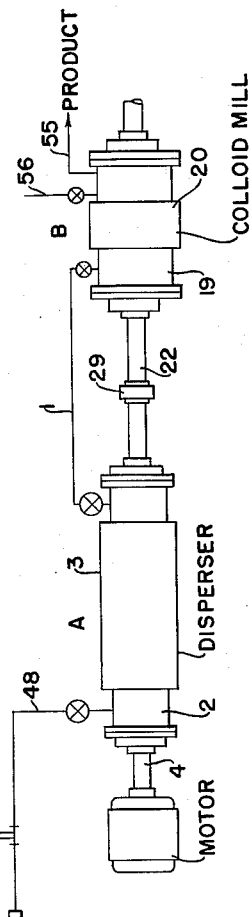
INVENTOR
GEORGE L. HELLER
BY
Pennie, Edmonds, Morton, Barrows & Taylor
ATTORNEYS May 1, 1962 G. L. HELLER 3,032,430
PROCESS FOR EFFECTING PARTICULATE DISPERSIONS
Filed Jan. 16, 1957 2 Sheets-Sheet 2

INVENTOR
GEORGE L. HELLER
BY Pennie, Edmonds,
Morton, Barrows & Taylor
ATTORNEYS 3,032,430
Patented May 1, 1962

3,032,430
PROCESS FOR EFFECTING PARTICULATE DISPERSIONS
George L. Heller, Monroe, La., assignor to Columbian Carbon Company, New York, N.Y., a corporation of Delaware
Filed Jan. 16, 1957, Ser. No. 634,478
7 Claims. (Cl. 106—307)

This invention relates to improved method and apparatus for preparing particulate dispersions of carbon black, or the like, in a liquid medium. It is especially applicable to the making of particulate disperson of carbon black in mineral oil, in the manufacture of newsprint ink, for instance. It is also applicable to the producing of particulate dispersions of carbon black in water, or other liquid medium, wherever a suspension free from agglomerates is desired.

Conventional methods of dispersing finely divided solids, e.g. pigments, in liquid vehicles, have included the use of either a ball mill, a roll mill, a burrstone mill or a colloid mill.

The burrstone mill, one of the oldest methods of effecting such dispersions, is not presently favored, mainly because of its low production rate and the excessive maintenance cost required to keep the surfaces of the grinding stones in proper condition.

The colloid mill has heretofore had only limited use, i.e. where the pigment loading is relatively low. However, in the case of carbon black, even at relatively low pigment loading, the colloid mill has a tendency to clog, resulting in frequent shutdowns for cleaning and maintenance. Also, where is has been attempted to disperse carbon black in a liquid vehicle by passing a mixture of the two through a colloid mill, excessive internal wearing of the mill has been experienced due to the high abrasive action of the carbon black.

The roll mill is frequently used in preparing carbon black dispersions where the presence of carbon black agglomerates in the resultant dispersion is not objectionable. Because of the remaining agglomerates, the roll mill is not satisfactory for the producing of inks, for instance.

For the type of dispersion desired in inks, ball milling has been the most satisfactory method heretofore available. However, even ball milling is subject to serious disadvantages. For instance, to effect satisfactory dispersion in mineral oil of a carbon black in powder form, of a density of about 12 pounds per cubic foot, has required from 4–8 hours of ball milling. Where the carbon black is used in beaded form, it has not been possible to eliminate an appreciable number of bead fragments or agglomerates from the final product, regardless of the duration of the ball milling.

Because of the convenience and cleanliness of handling, the ink manufacturers would prefer to use a carbon black in beaded form but, because of the above-mentioned objectionable agglomerates in the product, have been prevented from doing so. The carbon black industry would also much prefer to supply the carbon black to the ink trade in beaded form, as it is supplied to the rubber trade. Beaded carbon blacks, due to their greater density and free-flowing characteristics, can be shipped, stored and handled at lower cost. But the ink maker has continued to require a loose powder black of a density of about 12 pounds per cubic foot, in spite of the disadvantages accompanying its use.

But even where black in that form is used in the ball-milling operation, difficulties have ben experienced due to excessive viscosity of the resultant dispersions. Where the carbon black loading exceeds about 14 pounds per 100 pounds of oil, the viscosity of the dispersion becomes excessively high. Where it is attempted to use carbon black in beaded form, there is a still greater tendency toward excessive viscosity.

Various proposals have been made as to means and methods whereby carbon black loading might be increased without causing excessive viscosities and whereby the use of beaded carbon black in the manufacture of ink might be made feasible. For instance, it has been proposed to grind the beads before incorporating the carbon black in the oil. But some workers in this field have found that such preliminary grinding still further increases the number of agglomerates in the final dispersion. It has also been proposed to subject the ground or pulverized carbon black to ball milling at an elevated temperature. It has been proposed to disperse the beaded carbon black in the oil directly by passing the mixture through a three-roll mill. But to my knowledge no entirely satisfacory method of forming particulate dispersions of carbon black suitable for inks has heretofore been available.

My present invention provides a method whereby particulate dispersions of carbon black in liquid vehicles, and especially dispersions of carbon black in oil for use as newsprint ink, may be more economically and expeditiously prepared and which permit the introduction of the carbon black into the system in either powder or pelleted form. In accordance with my invention, I can accomplish, in a matter of seconds, results at least comparable with those obtained only by hours of ball milling, and, in the case of beaded blacks, results unobtainable by ball milling.

The results are made possible, in accordance with my present invention, by passing the carbon black and oil, for instance, continuously, and in uniformly controlled proportions, successively through a plurality of cooperating steps, as hereinafter described. The mixture is passed through the system as a continuous flowing stream in which the predetermined proportions of ingredients, supplied to the system, are maintained constant and uniform at every stage of the operation, no opportunity being afforded for phase separation, i.e. localized settling or separation of the solid particles.

The dispersing forces are uniformly applied to the mixture of carbon black and liquid as it passes through the system as a continuously flowing stream so that agglomerates are uniformly broken up and the particles thereof uniformly, thoroughly dispersed. Further, the concentration of solids in the final dispersion is nicely controlled solely by control of the proportions charged to the system. Difficulties due to excessive dispersion viscosity are minimized, even at relatively high loadings and even where the carbon black charged to the system is in beaded form.

The present invention has the advantages of continuity and economy of operation, speed and completeness of particulate disperson and high yields from relatively compact and inexpensive apparatus.

I have discovered that if the carbon black is adequately dispersed in the liquid medium, as hereinafter described, as a preliminary step, the resultant dispersion may thereafter be passed through a conventional colloid mill, and the aggregates remaining therein may thereby be uniformly disrupted and dispersed, without excessive wear of the colloid mill and at a surprisingly high rate of throughput.

Such preliminary dispersion is produced, in accordance with my present invention, by subjecting a mixture of carbon black, in either beaded or unbeaded form, and the fluid medium to the continuing action of a multiplicity of rapidly rotating blades, having sharp forward edges and a tip velocity of at least 3500 feet per minute, while passing as a flowing stream through a confined, elongated mixing zone of uniform and relatively small cross sectional area, in the manner described and claimed in my copending application Ser. No. 392,955, filed November 18, 1953, now abandoned, and divisional application Ser. No. 660,539, filed May 21, 1957, now Patent No. 2,972,473. The resultant suspension is then passed immediately, as a confined flowing stream, without permitting settling of the solid particles, directly to and through the colloid mill, and no clogging of the mill is experienced.

Where the composite operation is carried on in accordance with my present invention, the aggregates of carbon black, escaping the preliminary dispersing step, appear to be broken up by the viscous shear of the liquid medium in the colloid mill, as distinguished from a grinding action, the aggregates having been previously reduced by the first step of the process to a size where such action is possible. That the final dispersion is effected by such viscous shearing forces in the colloid mill, as distinguished from grinding action, appears from the fact that there is surprisingly little wear of the moving surfaces of the colloid mill.

It appears, therefore, that my preliminary dispersion step produces a suspension peculiarly adapted to treatment by my second step, due to some phenomena not fully understood, but by reason of which any aggregates remaining in the intermediate dispersion are rapidly broken up in the colloid mill, apparently by shearing forces exerted by the liquid medium.

The invention will be further described and illustrated with reference to the accompanying drawings of which FIG. 1 is a flow diagram of the process as applied to the production of newsprint ink, FIG. 2 is a vertical side view, partly in section, of dispersing apparatus which has been used with particular advantage in carrying out the process of the invention, and FIG. 3 is a transverse sectional view along line 3—3 of FIG. 2.

The preliminary dispersing step is carried out in the dispersing unit A, and the final dispersing step is effected in unit B, the preliminary dispersion passing immediately and directly from unit A to unit B through the valved conduit 1.

Depending upon the relative size or capacity of units A and B, two or more units B may be connected in parallel and fed by a branched conduit 1 leading directly from the preliminary dispersing unit A. However, for simplicity, I shall describe the process and apparatus in which a single unit B is used.

The preliminary dispersing unit A comprises an elongated tubular member 2 partially enclosed by a water-jacket 3 for maintaining the preliminary dispersion at a desired predetermined temperature. The shaft 4 extends longitudinally through the tube 2 and is rotaably and coaxially supported therein by journals 5 secured to the end plates 6 by means of machine screws 7. The plates 6 are in turn secured to the end flanges 8 of tube 2 and sealed against leakage by means of suitable gaskets or packing, not shown. The tube 2 is supported by brackets 9 secured by means of machine bolts 10 to bracket 11 which is secured to the base 12.

Extending inwardly from the wall of tubular member 2 are a plurality of stators 13 and, intermediate those stators, groups of blades 14 extend radially from shaft 4. These blades may be permanently fastened to the shaft, as by welding, but are with advantage welded to collars 15, adapted to be moved with respect to the shaft so as to adjust the position of the blades 14 and held in position by set screws 16.

These blades, as more particularly shown in FIG. 3 of the drawings, are composed of four outwardly extending arms 17 on centers spaced 90° apart. The forward edges 18 of these arms are so constructed as to form a knife edge, as by beveling one side of the forward edge of each arm, the other side of the edges remaining straight. The beveled surfaces of adjacent groups of blades may face in opposite directions so as to exert opposing propelling actions on the stream of slurry passing through conduit 2. The blades may be in alignment, as shown, but advantageously are positioned so that one leads the other slightly, as more particularly shown in the above noted application.

The unit B consists of a tubular casing 19, the central portion of which is surrounded by water-jacket 20. Positioned intermediate the ends of tube 19 and extending inwardly from the wall thereof, is a stator 21 having a gradually beveled inner surface, so that the circular opening through the stator is slightly reduced in the downstream direction. Extending coaxially through tube 19 is a rotatably mounted shaft 22 supported at each end by bearings 23, the tube 19 being closed at each end by end plates, gaskets, and the like, as described with respect to unit A.

Keyed to shaft 22, as indicated at 24, is a slightly tapered rotor 25 adapted to cooperate with the stator 21. Downstream from rotor 25 is a group of blades 26, substantially identical with those of unit A, secured to shaft 22 to rotate therewith as previously described.

The stator 21 is removably held in position by means of set screws 27 and brackets 28 secured, as by welding, to the inner wall of tube 19. The rotor may be moved by known means to right or left to adjust the minimum clearance between the stator 21 and the rotor 25.

Unit B is supported in any suitable means, as by brackets indicated at 9 and 11 and secured to common base 12.

In the particular apparatus illustrated in the drawings the units A and B are coaxially aligned and shaft 22 is directly connected with shaft 4 by means of coupling 29, the adjacent ends of the respective shafts being supported by bearings 30 secured by brackets 31 to the common base 12. The downstream end of shaft 22 is similarly supported. Driving means, e.g. an electric motor, is provided for rotating these shafts at high speed.

The flow diagram of FIG. 1 represents an application of the invention to the manufacture of newsprint ink. In this operation, a stream of a suitable ink oil vehicle is withdrawn from storage tank 32 through conduit 33, at a constant rate controlled by valve 34, is passed to the inlet of pump 35 and from the pump through conduit 36. Where the oil is of a viscous nature, it is frequently desirable to heat it somewhat to obtain a suitable viscosity before mixing it with the carbon black. In such cases, a preheater coil 37, of conventional type, is interposed in conduit 36. Otherwise, the oil may be passed directly through conduit 36, through meter 38 and from thence through conduit 39 into the preliminary mixer 40 at the predetermined constant rate. The mixer 40 may be of any known type suitable for continuously effecting a preliminary, relatively uniform mixing of the oil with the carbon black charged thereto.

The carbon black is withdrawn from the storage tank indicated at 41 through conduit 42, at a rate controlled by valve 43, onto the weigh feeder 44, of conventional type, from which the carbon black, either in beaded or unbeaded form, is delivered at a constant, predetermined rate to the preliminary mixer 40 by means of chute 45.

The preliminary mixture of carbon black and oil is constantly withdrawn as a continuously flowing stream from mixer 40 through conduit 46 by force pump 47 by which it is forced under pressure through valved connection 48 into the inlet end of dispersing unit A. Advantageously, means for purging the carbon black-oil mixture of air or other gas is positioned in line 48, as indicated at 49. Such purging of the mixture is especially advantageous in making ink as it prevents foaming and viscosity increase in the unit A.

Where desired, a regulated amount of a suitable liquid additive may be included in the oil-black mixture passed to the disperser by withdrawing the additive from storage, indicated at 50, and passing it through conduit 51 into the oil stream flowing through conduit 33, the proportions thus added being controlled by valve 52 and meter 53 interposed in conduit 51.

On entering the dispenser A, the mixture of carbon black and oil, in carefully controlled, predetermined proportions, and containing a predetermined proportion of an additive where desired, is passed through the mixing conduit 2 as a flowing stream while being subjected to the continuing action of the rotating blades operating at a tip velocity of 3500 feet per minute or higher. The carbon black agglomerates, for instance beads, are in this way subjected to the intense shearing action of the rotating blades and the violent hydraulic turbulence and impact or shock caused by the rapid rotation of the blades. This has been found to result in a reduction of carbon black aggregates to a size and extent which peculiarly adapt the mixture to the second dispersing stage in the colloid mill B. For best results the disperser A should be kept completely filled with the liquid suspension, free from air or other gases.

The preliminary dispersion thus formed passes through valved conduit 1 directly to the unit B and in passing through the latter must pass through the gradually decreasing clearance 54 between stator 21 and rotor 25. This clearance should, at its upstream end, be sufficient to accept solid aggregates or fragments of the carbon black at least 0.01 inch in size and the final clearance should not exceed 0.01 inch, preferably being adjustable down to 0.001 inch.

The finished dispersion may be withdrawn from unit B either through valved outlet 55 or valved outlet 56, preferably the former. The primary purpose of the valved connection 56 is the adding of further vehicle or additive to the dispersion passing from the clearance 54, where desired.

The rate at which the dispersion passes through the clearance 54 may be controlled, to some extent, by the back pressure maintained in the downstream chamber 57 of unit B by means of the valves positioned in the outlets 55 and 56, respectively. While passing through chamber 57, violent turbulence of the suspension is maintained by means of the rotating blades 26 and stator 58, which also serve to effect the mixing of further vehicle or additive with the suspension.

The forces by which the dispersion is effected in accordance with the present invention are not to be confused with a grinding or smearing action. It is essential that the rotating members be spaced from the stationary members sufficiently to avoid grinding or smearing of the black, as such conditions have been found to result in excessive wear and a build-up of the black on the solid surfaces, eventually necessitating discontinuing the operation. In the primary dispersing unit A, the clearances between moving and stationary parts should not be less than 1/16 inch, preferably within the range of 1/16 inch to 1/8 inch.

In the particular apparatus illustrated, the longitudinal wall of the preliminary dispersing unit A consists of 6-inch standard pipe size, 31 inches over-all length. The stators, uniformly spaced as shown in the drawing, are 3 inches in length, 3/16-inch thick and extend inwardly a distance of 1 inch, being spaced apart about a distance of 1½ inch. The shaft 4 is about 2 inches in diameter.

The outer casing of the final dispersing unit B is of 8-inch standard pipe size, 16¼ inch over-all length. The longitudinal dimension of the stator and the rotor is 3 inches. The stator 58 is 2 inches in length, otherwise being the same as stators 13.

The inlet 48 of the primary dispersing unit is 1 inch I.D. and conduit 1 connecting the outlet of unit A with the inlet of unit B is 1½ inch I.D. The valved outlets 55 and 56 from unit B are 1 inch I.D. and 1½ inch I.D., respectively.

Considerable heat is generated by reason of the tremendous forces exerted on the mixture passing through the apparatus resulting in the heating of the liquid stream.

It is important to avoid temperatures at which water, when used as the vehicle, would evaporate under existing pressure. Where oil is used as the dispersing liquid, evaporation or flash temperatures of the oil must be avoided. As a means of avoiding such undesirable temperatures, cooling water may be circulated through water jackets 3 and 20. Where desired, a liquid at a somewhat elevated temperature may be circulated through these jackets to control the viscosity of the liquid medium.

It will be understood that the dimensions and relative proportions of the apparatus used in carrying out the process is subject to considerable variation, so long as the continuous stream-line flow is maintained. Also, it will be understood that other types of colloid mills, having the specified minimum clearances and adapted to receive solid aggregates up to 0.01 inch, may be used to effect the final dispersion.

In the particular apparatus described, the preliminary dispersing unit A has a maximum effective capacity of about 500 gallons per minute, and unit B has an effective operating capacity of about 6 gallons per minute per mil of minimum clearance. Therefore, when using a preliminary dispersing unit of the size described, and operating it as maximum capacity, several secondary units B should be used connected in parallel, the number depending upon the minimum clearance of the colloid mill.

Where desired, one of the known surface active agents or suspension stabilizing agents may also be included in the dispersion. Such agents may be introduced in admixture with the liquid suspension medium or with the carbon black charged to the operation. Also a suspension stabilizing agent may, where desired, be mixed with the stream of suspension passing to or from the colloid mill.

It will be understood that the invention contemplates use in the preliminary dispersion step of rotating blades having a greater or less number of arms than shown in the drawings, and of blades having cutting edges beveled equally from each side as well as arrangements of blades of the specified type having all of the beveled edges facing in the same direction. Any such blade construction or arrangement will produce a satisfactory preliminary dispersion so long as the blades are provided with sharp forward edges and are operated at a minimum tip speed of at least 3500 feet per minute. The optimum r.p.m. of the shafts will vary with the diameter of the preliminary dispersing zone A. With a preliminary dispersing conduit 4 inches in diameter, I have with advantage rotated the shaft at about 5600 r.p.m., with a 6-inch conduit 3600 to 5000 r.p.m. and with a 2-inch conduit 7200 r.p.m. With the arrangement shown in the drawing, the rate of rotation of shaft 22 will, of course, equal that of shaft 4. While this arrangement is economically advantageous, it is not essential and means may be provided for operating shaft 22 at a speed different from that of shaft 4. This is usually desirable where a preliminary mixing conduit of less than about 4 inches in diameter is used.

The invention will be further illustrated by the following specific examples of its use in the manufacture of newsprint ink by dispersing carbon black in a mineral oil.

For comparative purposes, an ink paste prepared by ball milling for several hours, in accordance with conventional practice, a mixture composed of 73.5% mineral oil, 25% carbon black of the FF type in powder form, and 1.5% Gilsonite, each by weight, was tested and found to have the following properties:

Grindometer rating:
    1 streak showing _____ 3
    4 streaks showing _____ 2
    10 streaks showing _____ 0
Brookfield viscosity at 78° F.:
    6 r.p.m. _____ Centipoise__ 40,000
    30 r.p.m. _____do____ 14,740

The process of my invention and the advantages derived therefrom are illustrated by the following specific examples. In each of these examples, the carbon black used was of the FF type and the apparatus employed was that shown in Fig. 2 of the drawings, and of the dimensions previously set forth herein, unit A being operated at a blade-tip velocity of about 3500 feet per minute.

*Example I*

For comparative purposes, two runs were made, using a minimum colloid mill clearance of 0.01 inch. In each run, a preliminary mixture composed of 73.5% mineral oil, 25.0% carbon black and 1.5% Gilsonite, each by weight, was continuously charged to disperser A. In run 1, the carbon black was in beaded form while in run 2, the carbon black was in pulverized form. The product of each of these runs was tested with the following results:

| Run No. | 1 | 2 |
| --- | --- | --- |
| Grindometer Rating: | | |
|   1 streak showing | 2 | 2 |
|   4 streaks showing | 0 | 0 |
|   10 streaks showing | 0 | 0 |
| Brookfield Viscosity at 78° F.: | | |
|   6 r.p.m., cps | 13,500 | 19,800 |
|   30 r.p.m., cps | 3,800 | 5,100 |

From the foregoing, it appears that in each instance a product of superior grindometer rating was obtained having a viscosity substantially lower than that of conventional ink pastes of equal carbon black loading, produced by ball milling, regardless of whether a beaded or pulverized black was used.

The production rate obtained by my process will vary with the pressure at which the mixture is forced through the colloidal mill and also with the minimum colloidal mill clearance. The effect of pressure variation on production rate is illustrated by the following example:

*Example II*

In this operation, two runs were made using the same apparatus, colloid mill clearance and composition of charge used in the respective runs of the preceding example but varying the pressure on the charge to the colloid mill. Beaded black was used in run 3 and pulverized black in run 4. Other conditions remaining constant, the production rate was found to be slightly lower when the black was used in beaded form than where pulverized black was used. This relationship between pressure and production rate is illustrated by the following tabulation:

| | Production Rate— lbs./min. | |
| --- | --- | --- |
| | Run No. 3 | Run No. 4 |
| Pressure—lbs./sq. in.: | | |
|   20 | 22.2 | 23.8 |
|   40 | 54.7 | 57.8 |
|   60 | 84.8 | 98.5 |
|   80 | 103.8 | 126.0 |

In each instance, the grindometer ratings and the viscosity characteristics were substantially the same as the respective products of the preceding example.

The effect of variation in minimum clearance of the colloid mill is illustrated by the following example:

*Example III*

In this operation, the apparatus of the preceding examples was used with variations in minimum clearance of the colloid mill. The charge to the system was the same as that of the preceding examples with the exception that the carbon black constituent of the feed was, in each run, a carbon black which had been pelleted and subsequently pulverized by the conventional Micro-Pulverizer. In all other respects, the processing conditions were substantially identical with those of Example I. Four runs were made using the minimum colloid mill clearances and with the results set forth in the following tabulation:

| Run No. | 5 | 6 | 7 | 8 |
| --- | --- | --- | --- | --- |
| Clearance—inch | 0.007 | 0.008 | 0.009 | 0.010 |
| Grindometer Ratings: | | | | |
|   1 streak showing | 1 | 0 | 0 | 2 |
|   4 streaks showing | 0 | 0 | 0 | 0 |
|   10 streaks showing | 0 | 0 | 0 | 0 |
| Brookfield Viscosity at 78° F.: | | | | |
|   6 r.p.m.—cps | 16,700 | 12,800 | 13,100 | 19,800 |
|   30 r.p.m.—cps | 4,340 | 3,600 | 3,800 | 5,100 |

From the foregoing examples, it appears that ink superior in grindometer rating to those conventionally made by ball milling and of lower viscosity for equal carbon black loading may, in accordance with this invention, be continuously prepared at a high production rate.

From Example III, it appears that under conditions therein described, best results were obtained, both with respect to viscosity and completeness of dispersion, where a colloid mill clearance of 0.008–0.009 is used. This will vary somewhat with different compositions. Usually a minimum clearance no smaller than required to produce the desired results is recommended, to avoid reduced production rate. But minimum clearances in excess of about 0.01 inch have been found to be ineffectual.

As previously noted herein, the carbon black loading is subject to considerable variation without resulting in excessive viscosities, and various types of mineral oils may be used, either with or without dispersing agents or other additives. In making ink, for instance, the ordinary ink oils may be used. I have successfully used, for instance, SAE 30–40 lubricating oils. As an alternative for Gilsonite used in the preceding examples, other dispersing agents may be used, for instance, Coblax 1000. Any of the conventional additives may be incorporated in the dispersion, for instance, rosin, which effects a lowering of viscosity and of the coefficient of thixotropy.

These aspects of the invention are illustrated by the further specific examples, in each of which the apparatus employed was identical in design and proportions to that previously described and the carbon black was, in each instance, of the FF type. Where the black was used in the pulverized form, it was prepared by passing the beaded black through a Micro-Pulverizer using 0.010 screens.

*Example IV*

In this operation, a mixture consisting of 25 pounds of pulverized black per 100 pounds of oil was charged to the system, the minimum colloid mill clearance being set at 0.006 inch. No dispersing agent or additive was employed. The Brookfield viscosity of the resultant product at 75° F., using a No. 4 spindle, was 10,000 cps. at 6 r.p.m. and 3,140 cps. at 30 r.p.m.

*Example V*

In an operation identical with that of the preceding example, except that one pound of Gilsonite per 100 pounds of oil was included in the charge as a dispersing agent, the Brookfield viscosity under the same testing conditions was 6,000 cps. at 6 r.p.m. and 2,080 cps. at 30 r.p.m.

*Example VI*

In this operation, the charge was composed of 42.75 pounds of pulverized carbon black and one pound of Gilsonite per 100 pounds of oil, the operating conditions being otherwise as specified in Example IV. As tested in the preceding example, the product was found to have a Brookfield viscosity of 53,300 cps. at 6 r.p.m. and 12,800 cps. at 30 r.p.m.

*Example VII*

In this run, the operating conditions were identical with those of the preceding example except that 2 pounds of Gilsonite per 100 pounds of oil was included in the charge. The Brookfield viscosity of the product at 6 r.p.m. was 31,500 cps. and at 30 r.p.m. was 10,580 cps.

*Example VIII*

This operation was identical with that of the preceding example except that the carbon black was added in beaded form and the minimum colloid mill clearance was set at 0.004 inch. The Brookfield viscosity of the product at 6 r.p.m. was 33,500 cps. and at 30 r.p.m. was 9,920 cps.

*Example IX*

In this operation, the charge was composed of 42.75 pounds of pulverized carbon black and 4 pounds of Coblax per 100 pounds of oil and the colloid mill clearance was set at 0.004 inch. The Brookfield viscosity of the finished product was 65,700 cps. at 6 r.p.m. and 17,820 cps. at 30 r.p.m.

Where beaded carbon black was substituted for the pulverized carbon black, the Brookfield viscosity of the product was found to be 55,700 cps. at 6 r.p.m. and 12,840 cps. at 30 r.p.m.

*Example X*

In this operation, the charge was composed of 42.75 pounds of pulverized carbon black, 2 pounds of Gilsonite and 1 pound of rosin per 100 pounds of oil, the minimum colloid mill clearance being set at 0.004 inch. The Brookfield viscosity of the product was 12,500 cps. at 6 r.p.m. and 5,120 cps. at 30 r.p.m.

The relative speed of the colloid mill rotor, with respect to the stator, may be varied somewhat in accordance with conventional colloid mill operation. For instance, it may be varied from about 1,700 r.p.m. for a mill having a 21-inch diameter rotor to in excess of 17,000 r.p.m. for one having a 3-inch diameter rotor. By selecting a colloid mill of appropriate size, relative to the diameter of the disperser A, the mill may be driven directly by shaft 4. Otherwise, the disperser A and the mill B may be separately driven, each at its optimum speed.

The pressure at the colloid mill inlet may be varied, for instance, by varying the charging rate to the system or by recycling through the disperser A, a portion of the effluent therefrom or, at a given charge rate, by using a greater or less number of colloid mills connected in parallel, as previously indicated.

The grindometer ratings referred to herein were determined by the method tentatively approved by the American Society for Testing Materials entitled Proposed Tentative Method of Test for Fineness of Grind of Printing Inks by the Production Grindometer—Test Procedure 25.3 ASTM D-54T.

I claim:

1. A continuous process for producing particulate dispersions of finely-divided solid pigments in a liquid medium comprising the following steps in combination, forming a preliminary dispersion of the solid pigment particles in the liquid by continuously charging a preliminary mixture of the liquid and agglomerates of the solid pigment particles as a constant flowing stream through a confined, elongated dispersing zone of uniform and relatively small circular cross-section and disrupting the agglomerates of the solid pigment particles by subjecting the stream as it passes therethrough to a rapid succession of violent shearing forces of rotating, sharp-edged blades closely spaced longitudinally along the path of the stream and moving transversely to said path without substantial propulsion action on the stream at a tip velocity of at least 3500 feet per minute while inhibiting mass rotation of the mixture constituting the stream in the direction of the shearing forces by interposed baffling means extending longitudinally of said dispersing zone and avoiding mechanical grinding of the mixture, continuously passing the resultant slurry stream from the downstream end of the dispersing zone and, while maintaining the stream in adequate turbulence to prevent settling, passing the stream directly to and through a progressively decreasing annular clearance between coaxially-positioned, solid surfaces in rapid relative rotary motion, the maximum clearance being not less than 0.01 inch and the minimum not exceeding 0.01 inch.

2. The process of claim 1 in which the dispersion is effected in the substantial absence of gaseous media.

3. The process of claim 1 in which the mixture charged to the elongated dispersing zone consists essentially of carbon black and water.

4. The process of claim 1 in which the solid pigment to be dispersed is carbon black and the carbon black is charged to the system in beaded form.

5. The process of claim 1 in which the solid pigment to be dispersed is carbon black and the carbon black is charged to the system in powdered form.

6. A continuous process for producing particulate dispersions of carbon black in oil which comprises continuously mixing agglomerates of carbon black particles with a stream of oil in constant predetermined proportions and passing the resultant mixture as a constant flowing stream through a confined, elongated dispersing zone of uniform and relatively small cross-sectional area, disrupting the agglomerates of carbon black particles by subjecting the stream as it passed therethrough to a rapid succession of violent shearing forces of rotating sharp-edged blades closely spaced longitudinally along the path of the stream and moving transversely of said path, without substantial propulsion action on the stream, at a tip velocity of at least 3500 feet per minute, while inhibiting mass rotation of the mixture constituting the stream in the direction of the shearing forces by interposed baffling means extending longitudinally of said dispersing zone and avoiding mechanical grinding of the mixture, continuously passing the resultant slurry stream form the downstream end of the dispersing zone and, while maintaining the stream in adequate turbulence to prevent settling, passing the stream directly to and through a progressively decreasing annular clearance between coaxially-positioned, solid surfaces in rapid relative rotary motion, the maximum clearance between said surfaces being not less than 0.01 inch and the minimum not exceeding 0.01 inch.

7. The process of claim 6 in which the oil consists essentially of mineral oil.

References Cited in the file of this patent

UNITED STATES PATENTS

| | | |
|---|---|---|
| 1,449,067 | Snelling | Mar. 20, 1923 |
| 1,458,542 | Plauson | June 12, 1923 |
| 1,941,808 | McConnaughay | Jan. 2, 1934 |
| 2,149,281 | De Stubner | Mar. 7, 1939 |
| 2,213,056 | Skoog et al. | Aug. 27, 1940 |
| 2,326,595 | Young et al. | Aug. 10, 1943 |
| 2,487,533 | Eastman | Nov. 8, 1949 |

OTHER REFERENCES

Travis: "Mechanochemistry and the Colloid Mill," The Chemical Catalog Co. Inc., New York, 1928, pp. 148–163.